(12) United States Patent
Lerch et al.

(10) Patent No.: US 7,168,626 B2
(45) Date of Patent: Jan. 30, 2007

(54) IDENTIFICATION BAND USING SHORTING WIRE FOR ENABLING/DISABLING AN RFID TRANSPONDER CONTAINED THEREON

(75) Inventors: John W Lerch, Indialantic, FL (US); Joshua M. Girvin, Indialantic, FL (US)

(73) Assignee: Proximities, Inc., Melbourne, FL (US)

( * ) Notice: Subject to any disclaimer, the term of this patent is extended or adjusted under 35 U.S.C. 154(b) by 0 days.

(21) Appl. No.: 11/246,002

(22) Filed: Oct. 7, 2005

(65) Prior Publication Data

US 2006/0092028 A1    May 4, 2006

Related U.S. Application Data

(60) Provisional application No. 60/617,518, filed on Oct. 8, 2004.

(51) Int. Cl.
*G06K 19/06* (2006.01)

(52) U.S. Cl. .................. 235/492; 235/380; 340/572.9; 340/572.1

(58) Field of Classification Search ............... 235/380, 235/382; 340/572.8, 573.1, 573.4, 572.1, 340/568.2
See application file for complete search history.

(56) References Cited

U.S. PATENT DOCUMENTS

| | | | |
|---|---|---|---|
| 4,736,196 A | 4/1988 | McMahon et al. | |
| 4,800,543 A | 1/1989 | Lyndon-James et al. | |
| 4,833,807 A | 5/1989 | McLean | |
| 4,835,372 A | 5/1989 | Gombrich et al. | |
| 4,885,571 A | 12/1989 | Pauley et al. | |
| 4,973,944 A | 11/1990 | Maletta | |
| 4,980,671 A | 12/1990 | McCurdy | |
| 5,115,223 A * | 5/1992 | Moody ................... | 340/573.1 |
| 5,364,133 A | 11/1994 | Hofer et al. | |
| 5,374,921 A | 12/1994 | Martin et al. | |
| 5,423,574 A | 6/1995 | Forte-Pathroff | |
| 5,430,441 A | 7/1995 | Bickley et al. | |
| 5,448,846 A | 9/1995 | Peterson et al. | |
| 5,457,906 A | 10/1995 | Mosher, Jr. | |
| 5,471,197 A | 11/1995 | McCurdy et al. | |
| 5,504,474 A | 4/1996 | Libman et al. | |
| 5,512,879 A | 4/1996 | Stokes | |
| 5,612,675 A | 3/1997 | Jennings et al. | |
| 5,627,520 A | 5/1997 | Grubbs et al. | |
| 5,781,442 A | 7/1998 | Engleson et al. | |
| 5,831,535 A | 11/1998 | Reisman et al. | |
| 5,883,576 A | 3/1999 | De La Huerga | |
| 5,973,598 A | 10/1999 | Beigel | |
| 5,973,600 A | 10/1999 | Mosher, Jr. | |

(Continued)

*Primary Examiner*—Michael G. Lee
*Assistant Examiner*—Kristy A. Haupt
(74) *Attorney, Agent, or Firm*—Hamilton, Brook, Smith & Reynolds, P.C.

(57) ABSTRACT

An identification device formed from a band of material and a non-reusable tamper-resistant fastening arranged to join opposite end regions of the band. A radio frequency identification (RFID) transponder is disposed on the band. The transponder includes an RFID circuit, such as may be formed on an integrated circuit (IC) chip, and an antenna. First and second electrically conductive traces are coupled to different portions of the RFID transponder. The first and second traces are arranged such that the RFID transponder is disabled when the first and second electrically conductive traces come in contact with one another. Various arrangements of the conductive traces are described to achieve improved security and functionality over the prior art.

29 Claims, 7 Drawing Sheets

U.S. PATENT DOCUMENTS

| | | | |
|---|---|---|---|
| 5,977,877 A * | 11/1999 | McCulloch et al. ...... 340/572.8 | |
| 5,979,941 A | 11/1999 | Mosher et al. | |
| 6,021,494 A | 2/2000 | Bolan et al. | |
| 6,043,746 A | 3/2000 | Sorrells | |
| 6,050,622 A | 4/2000 | Gustafson | |
| 6,055,756 A | 5/2000 | Aoki | |
| 6,072,396 A | 6/2000 | Gaukel | |
| 6,104,295 A * | 8/2000 | Gaisser et al. ........... 340/573.4 | |
| 6,107,920 A | 8/2000 | Eberhardt et al. | |
| 6,142,368 A | 11/2000 | Mullins et al. | |
| 6,144,303 A | 11/2000 | Federman | |
| 6,219,789 B1 | 4/2001 | Little et al. | |
| 6,255,951 B1 | 7/2001 | De La Huerga | |
| 6,335,907 B1 | 1/2002 | Momich et al. | |
| 6,346,886 B1 | 2/2002 | De La Huerga | |
| 6,349,493 B1 | 2/2002 | Newman et al. | |
| 6,352,045 B1 | 3/2002 | Takashima | |
| 6,352,205 B1 | 3/2002 | Mullins et al. | |
| 6,384,727 B1 | 5/2002 | Diprizio et al. | |
| 6,421,013 B1 | 7/2002 | Chung | |
| 6,424,623 B1 | 7/2002 | Borgstahl et al. | |
| 6,431,455 B1 | 8/2002 | Ponert | |
| 6,434,158 B1 | 8/2002 | Harris et al. | |
| 6,434,159 B1 | 8/2002 | Woodward et al. | |
| 6,472,989 B2 | 10/2002 | Roy, Jr. | |
| 6,474,557 B2 | 11/2002 | Mullins et al. | |
| 6,483,427 B1 | 11/2002 | Werb | |
| 6,663,006 B2 | 12/2003 | Mullins et al. | |
| 6,693,543 B1 | 2/2004 | Stephenson et al. | |
| 6,744,367 B1 | 6/2004 | Forster | |
| 6,772,546 B2 | 8/2004 | Latschbacher et al. | |
| 6,782,648 B1 | 8/2004 | Mosher | |
| 2002/0003477 A1 | 1/2002 | Roy, Jr. | |
| 2002/0007292 A1 | 1/2002 | Paxton et al. | |
| 2002/0049656 A1 | 4/2002 | Lancos et al. | |
| 2002/0067264 A1 | 6/2002 | Soehnlen | |
| 2002/0070865 A1 | 6/2002 | Lancos et al. | |
| 2002/0082897 A1 | 6/2002 | Menelly et al. | |
| 2002/0084904 A1 | 7/2002 | De La Huerga | |
| 2003/0075608 A1 | 4/2003 | Atherton | |
| 2003/0173408 A1 | 9/2003 | Mosher, Jr. et al. | |
| 2004/0066296 A1 * | 4/2004 | Atherton .................. 340/572.1 | |
| 2004/0189470 A1 * | 9/2004 | Girvin et al. ............ 340/568.2 | |

* cited by examiner

IDENTIFICATION BAND USING SHORTING WIRE FOR ENABLING/DISABLING AN RFID TRANSPONDER CONTAINED THEREON

RELATED APPLICATION(S)

This application claims the benefit of U.S. Provisional Application No. 60/617,518, filed on Oct. 8, 2004. The entire teachings of the above application(s) are incorporated herein by reference.

FIELD OF THE INVENTION

The present invention relates to a non-reusable identification device that may be used to identify persons or articles.

BACKGROUND OF THE INVENTION

The present invention relates to an identification device that may be used to identify persons or articles, and more particularly to a mechanism for preventing reuse of the identification device.

Disposable bracelets have long been used for such things as identification, access control, and age verification, among other purposes. Such bracelets have typically been made from materials such as polyester, paper, or vinyl. The physical presence of a bracelet of particular color or design is traditionally used as a function identifier. For example, colored bracelets have been used in theme parks to quickly and uniquely identify patrons who have already paid for admission, or to control access to restricted areas. For example, a patron of legal drinking age may be given a bracelet of a certain color to indicate that the patron is old enough to access restricted areas such as beer sales areas, as compared to another bracelet good for admission only.

In recent years, such bracelets have been augmented with Radio Frequency Identification (RFID) technology. RFID extends the usefulness of such bracelets, as they can each be programmed with a unique code that quickly and easily identifies the wearer. RFID also adds new functionality to such bracelets. As one example, it can be used to located the wearer, with the installation of appropriate radio location equipment. A lost child wearing an RFID bracelet can thus be easily found, prevented from leaving an amusement park unless accompanied by an authorized adult, or even prevented from gaining access to restricted areas.

RFID bracelets are also used to allow the purchase of items without the exchange of currency or need for a credit/debit card. They can also be used to allow secure communication and monetary exchange among patrons (for example, a parent may authorize credit of funds to a child to allow a purchase up to a preselected amount). Upon entering a park or other venue, a patron can request that the bracelet issued to the patron or the patron's family members be credited for purchases up to a preselected amount. Purchases up to the preselected amount can then be made using the bracelet instead of using cash or credit/debit cards. The bracelet can also be coded so that a wearer would be prevented from making certain purchases, or from making a single purchase above a chosen limit, so that children, for example, are encouraged to spend their allotted funds wisely.

RFID bracelets of the type described above are most often made as inexpensive as possible, so as to be disposable. However, such bracelets are susceptible to misuse and unauthorized use. Some bracelets are easy to remove, yet still function after removal. A bracelet that still functions after it has been removed provides the opportunity for patrons to exchange bracelets. This could provide patrons with the opportunity to give access to a restricted area to an unauthorized patron. A patron issued an "adult" bracelet that allows access to beer sales, for example, could remove and give or sell that bracelet to a patron not of legal drinking age. As another example, a discarded bracelet that still has funds credited to it could be retrieved and used by an unauthorized individual to purchase goods or services using someone else's account.

A bracelet that is rendered non-functional after removal destroys its value for transfer to another patron, and would safeguard against unauthorized use of bracelets.

A number of mechanical measures have been taken to prevent such bracelets from being transferred. One approach is a single-use locking button mechanism found on some plastic bracelets. An example of this approach is found in U.S. Pat. No. 5,973,600.

Also known are adhesive locking mechanisms with slits that prevent the wearer from peeling the adhesive back and reattaching it. An example of that approach is found in U.S. Pat. No. 6,474,557.

Those mechanisms render tampering with the lock or adhesive obvious to a visual inspection of the bracelet and, in most cases, render the bracelet unwearable after removal. However, tampering with the band portion of the bracelet is not prevented by those mechanisms. It is still possible for the bracelet to be cut or torn away from the locking mechanism, and reattached with a simple piece of transparent tape or glue. To detect this sort of tampering, the person checking the bracelet would need to either make a full visual inspection of the bracelet or tug very firmly on the bracelet. This is slow, inconvenient, and impractical, especially when large numbers of people require identification. Furthermore, such a visual inspection is subject to human error, the most obvious being the failure of the bracelet checker to perform adequate inspection.

Thus, RFID technologies have made the process of identifying the bracelet wearer faster and more secure. However, these can also lead to complacency among those responsible for inspecting bracelets, and has a tendency to reduce the likelihood that the person checking the bracelet wearer will perform an adequate visual or physical inspection for tampering.

Special electronic bracelets that prevent transferability for ensuring that hospital patients or prisoners remain within a given proximity of their quarters are known. However, such designs are prohibitively bulky, expensive, and overly complex for use in high-volume applications with short-term use. As a result, they would not be disposable; i.e., not commercially viable for use in high volume bracelets. For example, U.S. Pat. Nos. 5,471,197 and 5,374,921 disclose the use of fiber optics to ensure that the bracelet is not removed. U.S. Pat. No. 6,144,303 describes a capacitive coupling between the bracelet and the wearer's skin. When the capacitance changes, indicating bracelet removal, an alarm is tripped. However, the methods and devices disclosed in those patents are unnecessarily complex and prohibitively expensive for disposable use.

U.S. Pat. Nos. 4,973,944 and 4,980,671 describe bracelets with DC current paths that run around the bracelet and form a closed circuit when the ends of the bracelet are brought together. This method involves complications when attempting to use it with conventional disposable bracelet designs, as it requires a large metal contact area to enable size adjustment of the bracelet. It also does not necessarily solve the problem of tampering because such bracelets are designed to activate an alarm when removed, not necessarily to prevent reattachment. The metal to metal contact surfaces could be easily reattached on a limb of a different user.

Certain prior art disposable identification bands have been made tamper resistant by including a disabling wire in the band. For example, in a co-pending U.S. patent application Ser. No. 10/400,049 on Mar. 26, 2003 by Girvin, J., and Lerch, J., entitled "Non-Reusable Identification Device", assigned to Proximities, Inc., the assignee of the present application, a disabling wire is run along the band and is arranged to disable an RFID transponder if the wire is cut. However, it could be reassembled to function on the wrist of another wearer.

Accordingly, an anti-tamper device which overcomes the shortcomings of the prior art is desired.

SUMMARY OF THE INVENTION

The present invention is an identification device formed from a band of material and a non-reusable tamper-resistant fastening arranged to join opposite end regions of the band. In one preferred embodiment, a Radio Frequency Identification (RFID) transponder is disposed on the band. The transponder includes an RFID circuit, such as may be formed on an integrated circuit (IC) made of silicon or organic semiconductors, and an antenna. A first electrically conductive trace is coupled to the RFID circuit and forms at least a first part of a connection between an antenna and the RFID circuit. A second electrically conductive trace is coupled to the RFID circuit and forms at least a second part of a connection between an antenna and the RFID circuit. The first and second traces are arranged such that the RFID circuit becomes disabled when the first and second electrically conductive traces come in contact with one another.

In a preferred, non-limiting embodiment, the first conductive trace may be an electrically conductive loop, and the second conductive trace may be an open wire. The conductive traces may then be arranged relative to each other such that an attempted repair of a cut in the band, such as with solder or tin foil, necessarily creates a connection between the first and second conductive traces, which disables the RFID transponder.

In a preferred non-limiting embodiment, the electrically conductive traces are typically run in parallel and in close proximity to one another, along substantially the entire length of the band. In another preferred embodiment, the traces at least partially overlap one another, with an insulating dielectric disposed between them.

In other such non-limiting embodiments, a frangible tab is formed on a periphery of the band. The frangible tab includes a wire coupling the first and second electrical traces, such that the RFID circuit will not function until the tab is removed. It will be clear to one skilled in the art that this embodiment may coexist with the previously described circuit arrangement.

DETAILED DESCRIPTION OF A PREFERRED EMBODIMENT

A description of preferred embodiments of the invention follows.

Figure 1:
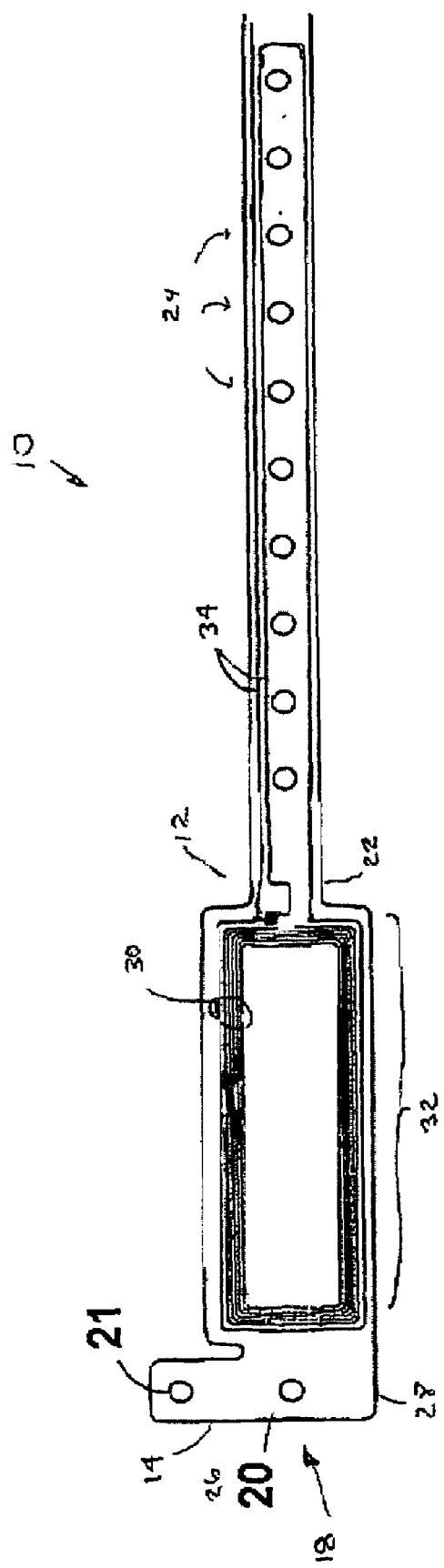
FIG. 1 is a top plan view of an identification band constructed according to the invention.
Figure 2:
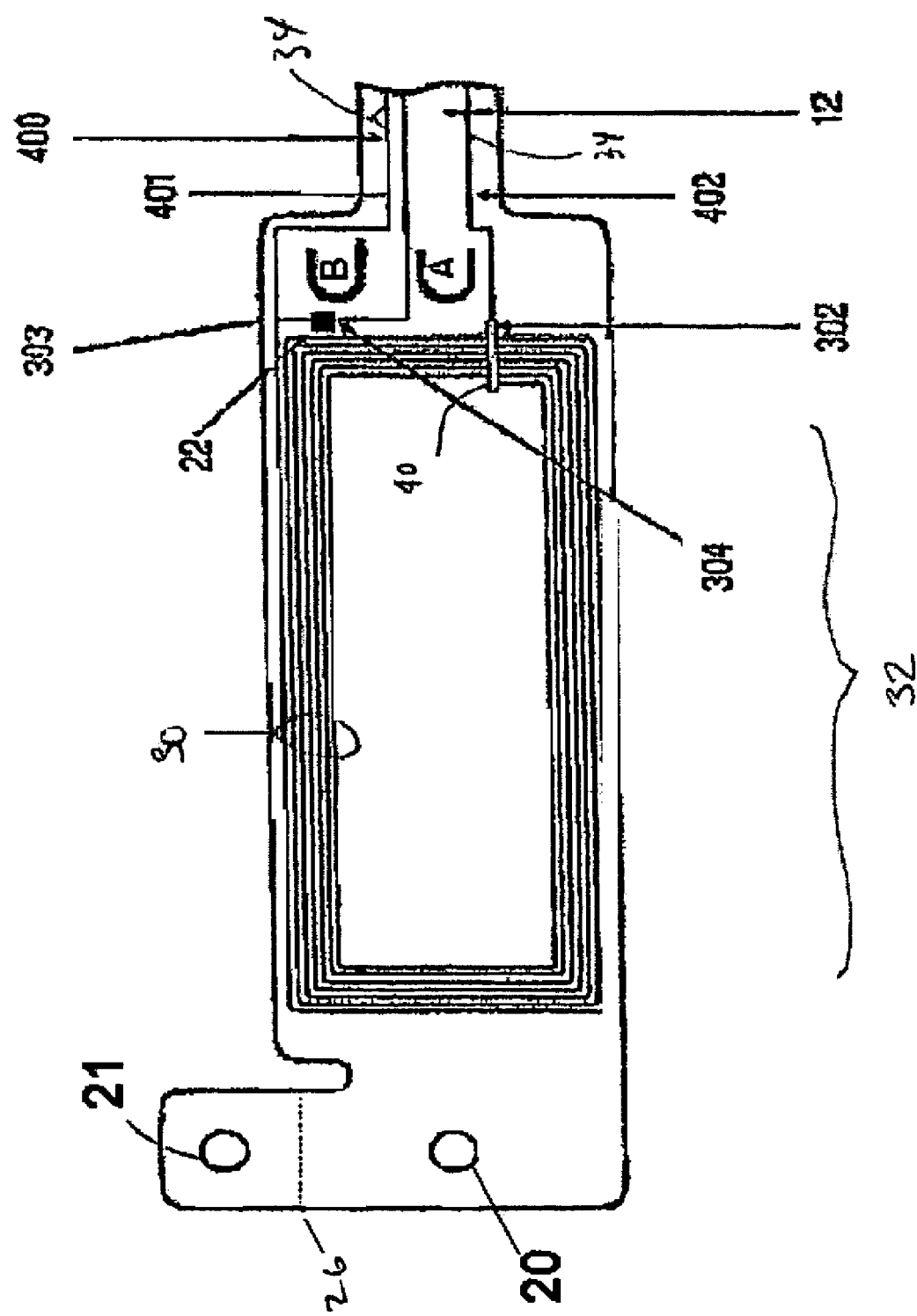
FIG. 2 is a top plan view of a tamper prevention structure containing tamper wires formed from a shorting wire and a disabling wire in accordance with one embodiment of the invention.

Reference is made to FIGS. 1 and 2 in which one embodiment of the present invention is shown. A radio frequency identification (RFID) bracelet 10 takes the form of elongated band 12 with a first end 14 and a second end 16 disposed at opposite ends of elongated band 12 from each other. First end 14 and second end 16 can be brought together and fastened to form a closed loop. A mechanical, non-reusable, tamper-resistant locking mechanism, generally indicated as 18, is specifically used to fasten the first end 14 to second end 16. Locking mechanism 18 is designed to make it quite difficult for a wearer to remove the bracelet 10 without rendering those tampering efforts visually obvious.

In one embodiment, locking mechanism 18 includes a flap 28 formed at first end 14 of the elongated band 12, a barbed peg 20 and a locking hole 21 in flap 28 for receiving barbed peg 20. At least one adjustment hole 24 is disposed towards second end 16 of band 12. Adjustment holes 24 are sized to receive barbed peg 20 therethrough.

During use, elongated band 12 is wrapped around a portion of the wearer's body (preferably a wrist). When first and second ends 14, 16 are brought together in an overlapping relation, barbed peg 20 is arranged to pass through a selected adjustment hole 24 as required for a snug fit. Flap 28 is then folded along imaginary fold line 26 and barbed peg 20 is then passed through locking hole 21. In this way, bracelet 10 may be adjusted to snugly conform to body parts of different users, preventing removal without tampering in the first instance.

Peg 20 is shaped to resist removal from said locking hole 21 without also destroying the locking mechanism 18 and rendering it incapable of being refastened. Alternatively, or in addition, adjustment holes 24 may be designed to replace or supplement locking hole 21 by configuring them in such a way that attempts to remove the bracelet by unfastening barbed peg 20 would also destroy adjustment hole 24, thereby disabling the bracelet and rendering it incapable of being refastened.

Bracelet 10 also includes a transponder 32. Transponder 32 contains an antenna 30 and an RFID integrated circuit (IC) chip 22. Transponder 32 receives a radio frequency (RF) interrogation signal, and in response thereto, emits an RF signal representative of information pre-stored or pre-programmed into RFID chip 22. For example, the information could include the date bracelet 10 is issued, the date bracelet 10 expires and will no longer allow access, the age status of the wearer, and whether bracelet 10 can be used for purchasing goods or services. Any other desired information, depending on the context in which the bracelet is to be used, may be pre-stored or pre-programmed in the transponder or in a database associated with the interrogation signal source. The signal may be used to access information stored in the database.

Transponder 32 is passive and derives its power, as known in the art, from the energy of the incoming signal at antenna 30. In the preferred non-exemplary embodiment, the antenna 30 is a continuous electrically conductive coil heretofore a "loop" antenna.

Multiple tamper wires 34 are electronically coupled to transponder 32 and complete a transponder circuit. Tamper wires 34 extend along elongated band 12 away from transponder 32. Tamper wires 34 form an electrically conductive path, from antenna 30 out to end 16 and back to antenna 30, along substantially the entire length of the band 12. As will be explained in detail below, the tamper wires 34 are arranged to connect the components of transponder 32 and/or form portions of the components themselves in a predetermined configuration, such that wires 34 must remain intact for the transponder 32 to operate.

In the embodiment of FIG. 1, one or more of tamper wires 34 may function as part of antenna 30. In such an embodiment, consideration should be given to the distance between the sections of loop antenna 30 and tamper wires 34 in order to minimize inductance that can otherwise lead to possible interference with the operation of the other components of transponder 32. In the preferred embodiment, the tamper wires are less than 2 mm apart.

Tamper wires 34 are preferably, by way of non-limiting example, made from printed conductive ink that is robust enough to withstand bending and twisting associated with normal handling but fragile enough that it will be broken if a user attempts to remove bracelet 10. Alternatively, tamper wires 34 may be a thin gauge wire such as copper wire, a thin foil, or other suitable electrically conductive material that will form an electrically continuous path but will break as a result of an unintended use or tampering. Forming tamper wires 34 with frangible zones, where stresses from tampering attempts are most likely to occur, may facilitate breakage of tamper wire 34, opening the antenna circuit, preventing further use. Of course, if the user attempts to remove bracelet 10 with a cutting implement, the conductor forming tamper wires 34 will also be severed as elongated band 12 is severed, again opening the circuit.

FIG. 2 shows a detailed view of an elongated band 12 and tamper wires 34. As will be shown, in one embodiment, tamper wires 34 may be made up of multiple conductors having different functions. One of tamper wires 34 is used as an additional conductive trace. The additional trace is a so-called shorting loop. As shown in FIG. 2, loop antenna 30 is conductively connected to an RFID chip 22 at a first circuit node 303. A second circuit node 302 connects to an inner coil of the loop antenna 30 over an insulator 40.

Here, tamper wires 34 are provided as three conductive traces 400, 401 and 402. A first conductive trace 400 runs from circuit node 303 along elongated band 12 towards second end 16, along adjustment holes 24. A second conductive trace 401 is conductively coupled to RFID chip 22 at a third circuit node 304. Conductive trace 401 runs from circuit node 304 out along elongated band 12. A third conductive trace 402 runs from circuit node 302 along elongated band 12 towards second end 16 along adjustment holes 24. By referencing the fact that various traces 400, 401, and 402 run along elongated band 12, it should be understood that the traces could either run all the way to second end 16 of elongated band 12 and/or stop at some point along elongated band 12 or be routed anywhere on the band, such as around adjustment holes 24, by way of non-limiting example.

It is important to recognize that because various conductive traces 400, 401, and 402 are part of the transponder circuitry in this embodiment, they must be connected in a particular way in order for RFID transponder 32 to operate. Specifically, loop antenna 30 will only be connected to RFID chip 22 if trace 401 is also connected to trace 402 to complete the circuit between them. The circuit path is that shown by arrow A. Likewise, the RFID function will only be enabled if trace 400 is not connected to either trace 401 or trace 402. If either of these conditions is not true, then the circuit will be either open or shorted and RFID chip 22 will not receive power or a signal, and bracelet 10 will cease to function. The shorted circuit path is that shown by arrow B. Antenna 30 is removed from the circuit.

We thus also refer herein to conductive trace 400 as a shorting wire, since it must remain in an electrically open state, without contacting other traces 401 or 402 to avoid shorting the circuitry of RFID chip 22. Similarly, we refer herein to conductive traces 401 and 402 as disabling wires, since if they do not remain intact, the circuit opens and RFID transponder 32 will not function.

During use, if elongated band 12 is cut, torn or otherwise broken to remove it from one wearer to give to another, trace wires 401 and 402 become disrupted opening the circuit and disabling transponder 32. The electric circuit must be reestablished. This is done by soldering or bridging the circuit with new conductive material. These processes are not very exact and often require heat. Traces 401, 402 are situated sufficiently close to shorting wire 400 so that the solder, foil or even the repairer's attempts at replacement of elongated band 12 will bring shorting wire 401 in conductive contact with either of traces 401 and 402. In the preferred embodiment, the distance is between 1 mm and 2 mm.

If shorting wire 400 is shorted to, for example, disabling wire 401 during an attempted repair of a cut band such as with solder or tin foil, then the short across RFID chip 22 will prevent current from flowing between the loop antenna 30 and RFID chip 22. In other words, for transponder 32 to function, current must not flow in the circuit path as shown by arrow B.

Likewise, if the disabling wires 401 and 402 are disconnected from one another, the circuit will be open and current will not be allowed to flow between the terminals of loop antenna 30 and RFID chip 22. In other words, current must flow in the circuit path of arrow A for transponder 32 to function. The positioning of traces 400, 401 and 402 is such that repair of the open circuit will result in a short circuit as discussed above.

Figure 3:
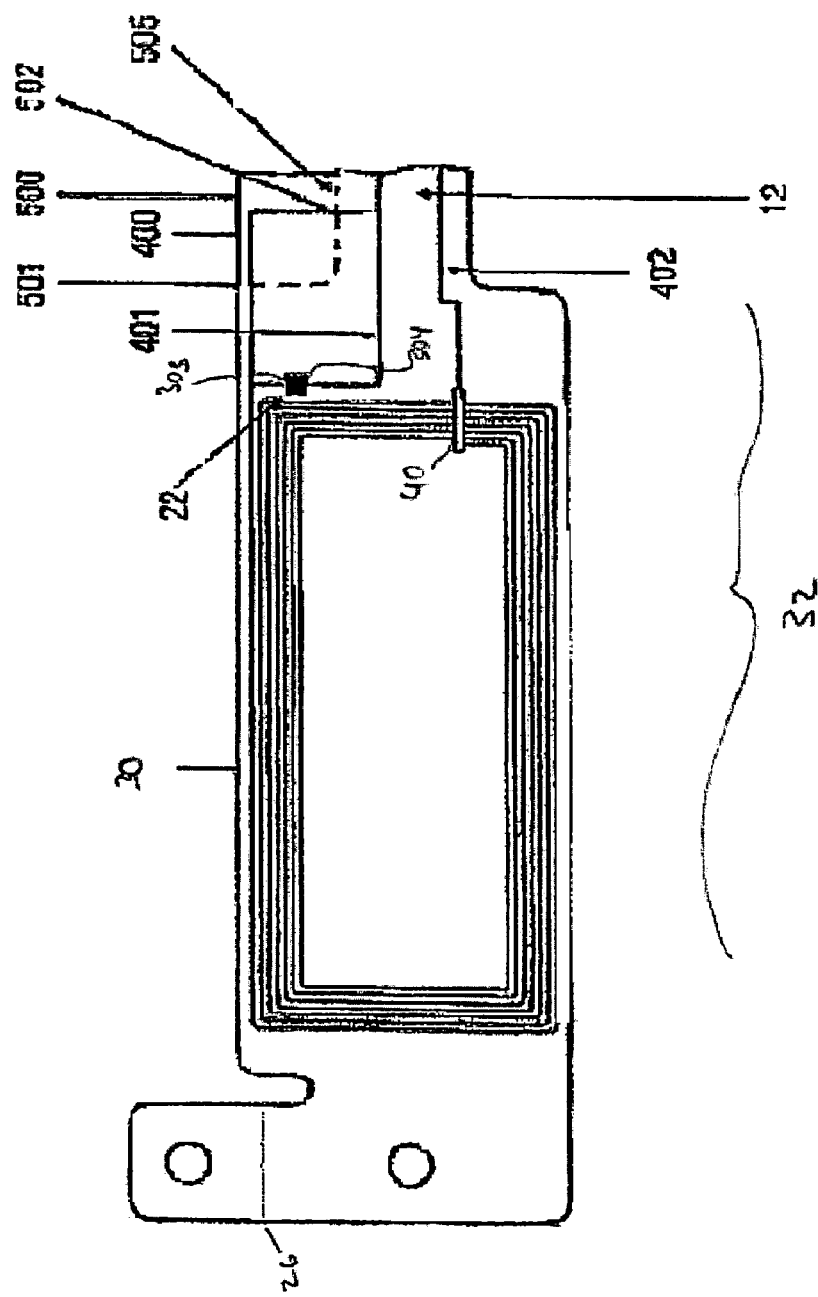
FIG. 3 is a top plan view of a tamper prevention and enabling structure containing a frangible tab including a shorting wire for transponder activation constructed in accordance with a second embodiment of the invention.

Reference is now made to FIG. 3 in which one alternate embodiment where a frangible tab 500 can be used to provide an enabling function for elongated band 12. Like numerals are used to identify like structure, the primary difference being that shorting wire 400 is run along a path that not only includes the main body portion of elongated band 12, but also includes a frangible tab portion 500 on elongated band 12. Frangible tab 500 is easily broken away from the remainder of bracelet 10, such as by bending across a perforation 505. Shorting wire 400 in this configuration is connected between circuit node 501 and circuit node 502 on perforation 505. In the as-manufactured configuration, shorting wire 400 is shorted to trace 401, which forms part of the disabling wire. This has the effect of acting as a short across circuit nodes 303 and 304 of RFID chip 22, thus preventing its operation, as previously described.

Therefore, in order to enable the operation of elongated band 12, frangible tab 500 is broken off, thus leaving only the portions of elongated band 12 intact that are below perforation 505. This causes a break in shorting wire 400 opening its connection to disabling wire 401. This, in turn, enables the RFID function to operate, i.e., thereby allowing current to flow to RFID chip 22 since it is no longer shorted.

It should be understood that various other uses can be made of frangible tab 500 and tamper wires 34 to enable and/or disable the band as needed. For example, if at least a portion of disabling wire 401 were instead run on frangible tab 500, the RFID function would be enabled until the frangible tab was broken off, at which point its function would cease. In another embodiment, frangible tab 500 is located at a distal end of elongated band 12, thereby enabling shorting wire 400 to initially disable the RFID function.

Figure 4:
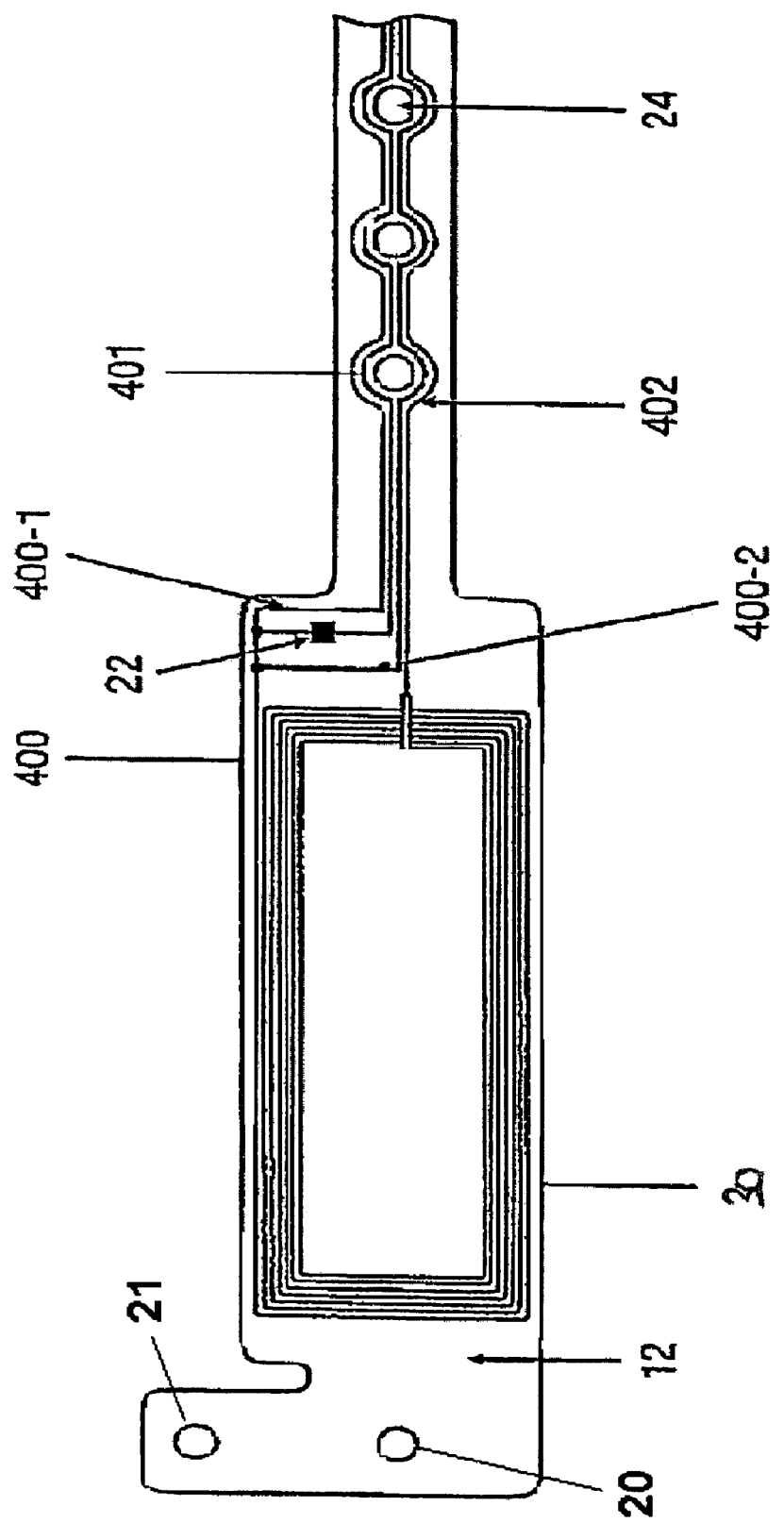
FIG. 4 is a top plan view of a tamper prevention structure containing multiple shorting wires constructed in accordance with a third embodiment of the invention.

Reference is now made to FIG. 4 in which a third embodiment of the invention is provided. Like numerals are used to define like structures. The primary difference in this embodiment being the use of tamper wires 34 that include multiple shorting wires 400. In particular, a first shorting wire 400-1 and a second shorting wire 400-2 may each run in parallel down a length of elongated band 12 adjacent to respective disabling wires 401 and 402.

In the configuration shown, for example, a first disabling wire 401 runs along the length of the band closely encircling the top portions of adjustment holes 24. Also running along the length of the band adjacent and in close proximity to disabling wire 401 is a first shorting wire 400-1. Similarly, on a bottom portion of elongated band 12, second disabling wire 402 runs along the band adjacent to the bottom portions of adjustment holes 24. A second shorting wire 400-2 is run along the length of the band adjacent and in close proximity to disabling wire 402.

This configuration provides further protection against an attempted repair by increasing the likelihood that placing a piece of tin foil or other conductor across a perpendicular cut made in the band creates a short circuit. If the attempted repair shorts any of the shorting wires 400 against any of the disabling wires 401 or 402, the transponder 32 will cease to operate as discussed above.

Figure 5:
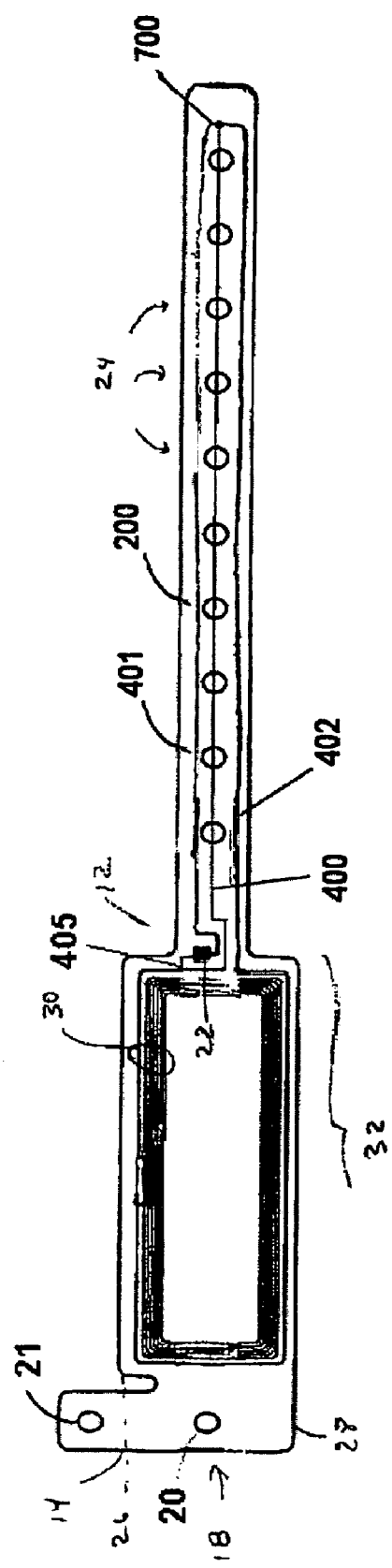
FIG. 5 is a top plan view of a tamper prevention structure containing a shorting wire arranged to run over the adjustment holes for transponder activation in accordance with a fourth embodiment of the invention.

Reference is now made to FIG. 5 which shows another embodiment of the invention. Again, like numerals are used to identify like structure. The primary difference in this embodiment being the use of shorting wire 400 disposed across adjustment holes 24. In this embodiment, adjustment holes 24 are initially formed as perforations in elongated band 12. Shorting wire 400 runs along the length of elongated band 12 substantially across the middle of respective adjustment holes 24, preferably through the middle thereof. Initially, shorting wire 400 is connected across RFID chip 22 to one or more of disabling wires 401, 402 at nodes 405, 700, thereby shorting out RFID chip 22 and/or loop antenna 30. With shorting wire 400 still intact, transponder 32 will thus be disabled as manufactured.

Upon a punch-through of one of adjustment holes 24, such as by installing elongated band 12 around a person's wrist, and then inserting peg 20 through adjustment hole 24, peg 20, passing through adjustment hole 24 breaks shorting wire 400. This break in the conductivity between shorting wire 400 and the peripheral enabling wires 401 and 402 will thus reopen the connection, thereby enabling the transponder 32 to function.

In a preferred non-limiting embodiment, adjustment holes 24 are closed at time of manufacture. The positioning of the holes is determined by perforations within band 12. Therefore, material is present across adjustment hole 24 at time of manufacture which may be easily removed as a result of the perforations. In this way, support is provided for shorting wire 400 to prevent inadvertent breakage.

Figure 6:
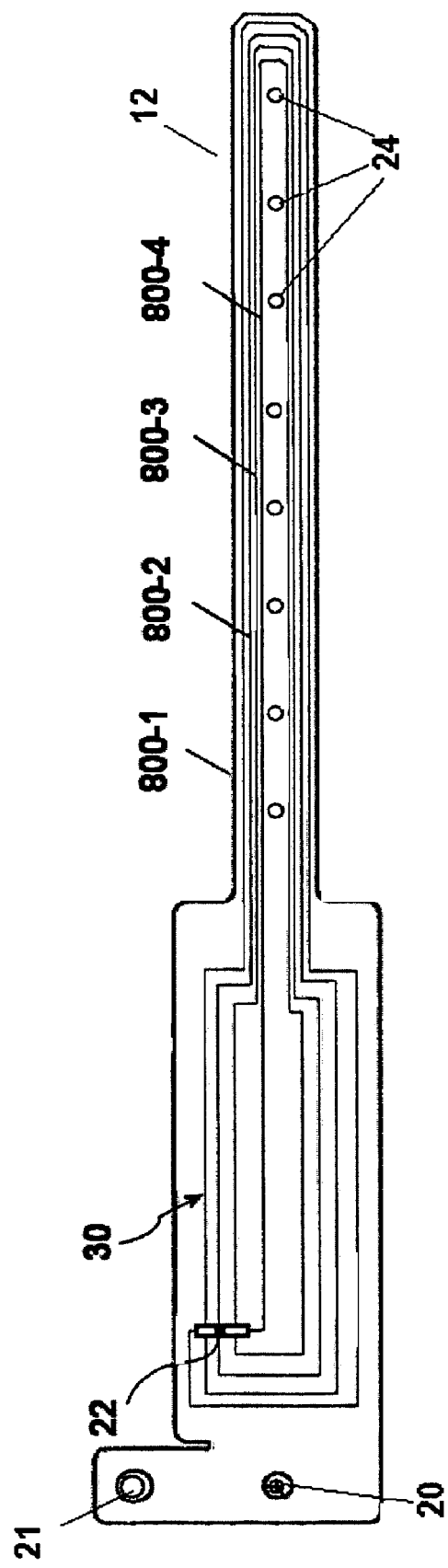
FIG. 6 is a top plan view of a tamper prevention structure containing antenna coils used as disabling wires, in accordance with a fifth embodiment of the invention.

Reference is now made to FIG. 6 which shows another embodiment of the invention. Like numbers are utilized to indicate like structure. The primary difference for this embodiment being the use of multiple conductors running along the length of elongated band 12. Loop antenna 30 is configured as a coil of multiple loops as in the previous embodiments. However, in this arrangement, each loop section is run along substantially the entire length of elongated band 12. Thus, the conductive traces 800-1, 800-2, 800-3, 800-4 forming an extended portion of loop antenna 130, extend along the band. Each conductive trace remains intact for loop antenna 30 to operate. Severing any one of conductors 800-1, 800-2, 800-3, or 800-4 will prevent transponder 32 from operating. In a preferred non-limiting embodiment, the extending conducting traces 800-1, 800-2, 800-3, and 800-4 are positioned closely adjacent one another in order to minimize the effective inductance that they present to the remainder of the main portion of loop antenna 30. In the preferred non-limiting embodiment, the conducting traces 800 are less than 2 mm apart.

Figure 7:
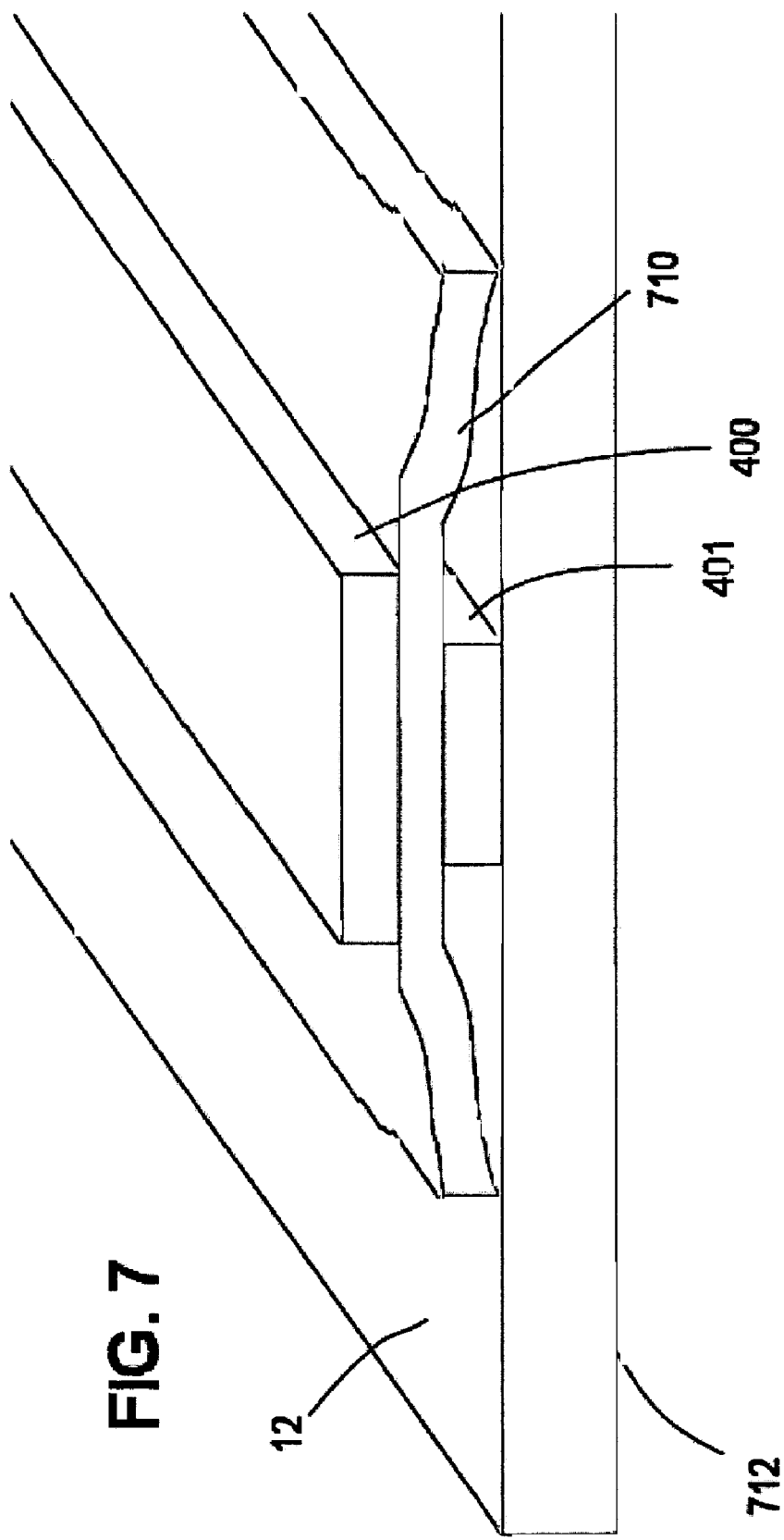
FIG. 7 is a perspective sectional view of a tamper prevention structure containing a shorting wire overlapping a disabling wire in accordance with a sixth embodiment of the invention.

Reference is now made to FIG. 7 in which yet another embodiment of a band constructed in accordance with the invention is provided. The primary difference in this embodiment being the overlapping juxtaposition of the shorting wire and disabling wire. Band 12 is formed from a substrate material 712. A disabling wire 401 is disposed along a portion of substrate 712. An insulator 710 covers at least a portion of disabling wire 401. Shorting wire 400 is disposed upon at least a portion of insulator 17 at least partially in overlapping position relative to shorting wire 401.

It is noted that in the example, shorting wire 400 and disabling wire 401 are shown in parallel. However, the wires can be in relative positioning to intersect each other at 90° angles or anywhere in between. What is required is that at least a portion of shorting wire 400 and disabling wire 401 overlay each other with insulating layer 710 sandwiched therebetween. As a result, insulator 710 need only be applied to areas where shorting wire 400 overlaps other wires within the transponder 32 circuitry. Because shorting wire 400 will carry no current while there is no connection to another part of transponder 32, the capacitive impact of this overlap will be minimal. Once shorting wire 400 becomes connected with disabling wire 401, or any other conductive portion of transponder 32, such as in an attempt to repair cut traces, not only is RFID chip 22 (not pictured) short-circuited, but a substantial capacitance is introduced to the circuit, which will in turn detune the antenna.

Insulator 700 is preferably applied as a thin coat of material, such that it is likely to melt, tear, or otherwise break down during an attempt at repairing a broken trace.

Shorting wire 400 may partially overlap disabling wire 401, overlap multiple disabling wires, or lie underneath disabling wire 401. Preferably, shorting wire 401 will overlap at least one disabling wire with some additional margin.

It should be understood now that we have explained but a few of the possible embodiments, and that other arrangements of loops and of shorting wires can be used to accomplish the objectives of the invention.

While this invention has been particularly shown and described with references to preferred embodiments thereof, it will be understood by those skilled in the art that various changes in form and details may be made therein without departing from the scope of the invention encompassed by the appended claims.

What is claimed is:

1. An identification apparatus, comprising:
    a band;
    an RFID transponder disposed on the band, the RFID transponder having an RFID circuit and an antenna conductively coupled to the RFID circuit;
    a first electrically conductive trace coupled to at least a first part the RFID circuit; and
    a second electrically conductive trace coupled to a second part of the RFID circuit, such that the RFID circuit becomes disabled when the first electrically conductive trace conductively couples with the second electrically conductive trace.

2. The identification apparatus of claim 1, wherein the first electrically conductive trace is an electrically conductive wire loop extending along at least a portion of the band.

3. The identification apparatus of claim 1, wherein the first electrically conductive trace is disposed on the band in a spaced relation to said second electrically conductive trace such that an attempted repair of a disruption in the band creates an electrical connection between the first electrically conductive trace and the second electrically conductive trace, thereby disabling the RFID circuit.

4. The identification apparatus of claim 3, wherein the spaced relation comprises a gap between said first electrically conductive trace and said second electrically conductive trace sufficiently small to ensure a short circuit upon repair.

5. The identification apparatus of claim 1, further comprising an insulating layer disposed between at least a portion of the first electrically conductive trace and at least a portion of the second electrically conductive trace.

6. The identification apparatus of claim 1, further comprising a frangible tab formed on a periphery of the band, a shorting wire disposed on said frangible tab conductively coupling the RFID transponder and at least one of said first electrically conductive trace and said second electrically conductive trace, such that the RFID circuit is disabled until the tab is removed from said band.

7. The identification apparatus of claim 1, further comprising a plurality of adjustment holes extending along a length of the band, wherein at least one of the first and second conductive traces run in close proximity to one or more of the adjustment holes.

8. The identification apparatus of claim 7, wherein at least one conductive trace substantially encircles one or more of the adjustment holes, such that a break in the band located between adjacent holes severs the at least one of the first and second conductive traces.

9. The identification apparatus of claim 1, wherein the RFID circuit and the antenna are electrically coupled in series with the first electrically conductive trace, such that severance of the first electrically conductive trace disables the RFID circuit.

10. The identification apparatus of claim 1, further comprising a plurality of adjustment holes extending along a length of the band, wherein each of the plurality of adjustment holes are formed as perforations in the band, and the second electrically conductive traces extends across each of the plurality of adjustment holes and is coupled to the first electrically conductive trace.

11. An identification apparatus comprising:
    an RFID transponder having an RFID circuit and an antenna coupled to the RFID circuit;
    a first conductive loop connected in series with the antenna and the RFID circuit; and
    a second conductive loop connected in parallel with one of the RFID circuit and the antenna, such that the RFID transponder will not function unless the first conductive loop is closed and the second conductive loop is open.

12. The identification apparatus of claim 11, wherein the second conductive loop is initially open, but becomes closed in response to repair of said identification apparatus.

13. The identification apparatus of claim 11, where the first conductive loop is initially closed, but becomes open in response to tampering with the apparatus.

14. The identification apparatus of claim 11, wherein at least a portion of the first and second conductive loops are in sufficiently close proximity to one another such that repair of either said first or second loop causes said second conductive loop to be closed.

15. The identification apparatus of claim 11, wherein at least a portion of the first and second conductive loops overlap one another.

16. An identification apparatus comprising:
    a band;
    an RFID circuit disposed on the band;
    an antenna disposed on the band connected across the RFID circuit; and a first conductive trace conductively connected between said antenna and RFID circuit, a second conductive trace conductively connected between said antenna and RFID circuit, such that connecting the first and second traces short-circuits the RFID circuit.

17. The identification apparatus of claim 16, wherein the first conductive trace forms a closed loop.

18. The identification apparatus of claim 16, wherein the first electrically conductive trace is disposed on close proximity to said second conductive trace along at least a portion of the band.

19. The identification apparatus of claim 16, wherein the first electrically conductive trace overlaps at least a portion of said second electrically conductive trace, and further comprising an insulating layer disposed between at least a portion of said first electrically conductive trace and at least a portion of second electrically conductive trace.

20. An anti-tampering device for a bracelet having a band, an RFID transponder disposed on said band, said RFID transponder having an RFID circuit and an antenna coupled to the RFID circuit; said anti-tampering device comprising:
    a first conductive loop connected in series with the antenna and the RFID circuit;
    a second conductive loop connected in parallel with one of the RFID circuit and the antenna, such that the RFID transponder will not function unless the first conductive loop is closed and the second conductive loop is open.

21. The anti-tampering device of claim 20, wherein at least a portion of the first and second conductive loops are in sufficiently close proximity to one another such that repair of either said first or second loop causes said second conductive loop to be closed.

22. An anti-tampering device for a bracelet having a band, an RFID transponder disposed on said band, said RFID transponder having an RFID circuit and an antenna coupled to the RFID circuit; said anti-tampering device comprising:
    a first electrically conductive trace coupled to at least a first part of the RFID transponder;

and a second electrically conductive trace coupled to a second part of the RFID circuit, such that the RFID circuit becomes disabled when the first electrically conductive trace conductively couples with the second electrically conductive trace.

23. The anti-tampering device of claim 22, wherein the first electrically conductive trace is an electrically conductive wire loop extending along at least a portion of the band.

24. The anti-tampering device of claim 22, wherein the first electrically conductive trace is disposed on the band such that an attempted repair of a disruption in the band necessarily creates an electrical connection between the first electrically conductive trace and the second electrically conducted trace thereby disabling the RFID circuit.

25. The anti-tampering device of claim 22, further comprising an insulating layer disposed between a portion of the first electrically conductive trace and the second electrically conductive trace.

26. The anti-tampering device of claim 22, further comprising a plurality of adjustment holes extending along a length of the band wherein at least one conductive trace runs in close proximity to one or more of the adjustment holes.

27. An Identification apparatus comprising:
a band;
an RFID transponder disposed on the band, the RFID transponder having an RFID circuit and an antenna conductively coupled to the RFID circuit;
a first electrically conductive trace coupled to at least a first part of the RFID circuit;
a second electrically conductive trace coupled to a second part of the RFID circuit and said first electrically conductive trace such that RFID circuit becomes disabled when the first electrically conductive trace conductively couples with the second electrically conductive trace, and a disruption in said second electrically conductive trace enables said RFID circuit.

28. The identification apparatus of claim 27, further comprising:
a frangible portion selectively removeably attached to said band, at least a portion of said electrically conductive trace being disposed on said band such that removal of said frangible portion removes at least a portion of said second electrically conductive trace.

29. The identification apparatus of claim 27, further comprising at least one adjustment hole extending along said band; said second electrically conductive trace extending across said hole; and
a pin disposed on said band and dimensioned to be received by said adjustment hole.

* * * * *